US011795301B2

(12) United States Patent
Grun et al.

(10) Patent No.: US 11,795,301 B2
(45) Date of Patent: Oct. 24, 2023

(54) FIXING SYSTEMS HAVING FINE-PARTICLE FILLERS

(71) Applicant: fischerwerke GmbH & Co. KG, Waldachtal (DE)

(72) Inventors: Jurgen Grun, Bötzingen (DE); Martin Vogel, Glottertal (DE); Clemens Schmidt, Denzlingen (DE); Christian Schlenk, Denzlingen (DE)

(73) Assignee: fischerwerke GmbH & Co. KG, Waldachtal (DE)

( * ) Notice: Subject to any disclaimer, the term of this patent is extended or adjusted under 35 U.S.C. 154(b) by 399 days.

(21) Appl. No.: 16/897,675

(22) Filed: Jun. 10, 2020

(65) Prior Publication Data
US 2020/0299486 A1   Sep. 24, 2020

Related U.S. Application Data

(63) Continuation of application No. 14/860,870, filed on Sep. 22, 2015, now Pat. No. 10,711,116.

(30) Foreign Application Priority Data

Sep. 23, 2014   (DE) .................... 10 2014 013 800.3
Aug. 13, 2015   (DE) .................... 10 2015 113 352.0

(51) Int. Cl.
| | |
|---|---|
| C08K 5/54 | (2006.01) |
| C04B 26/06 | (2006.01) |
| C04B 26/10 | (2006.01) |
| C04B 26/14 | (2006.01) |
| C04B 26/16 | (2006.01) |
| C04B 40/06 | (2006.01) |
| C08G 18/67 | (2006.01) |
| C08K 3/22 | (2006.01) |
| C08K 3/36 | (2006.01) |
| C08L 63/00 | (2006.01) |
| C08L 75/14 | (2006.01) |
| C08L 75/16 | (2006.01) |
| C09J 4/00 | (2006.01) |
| E04B 1/41 | (2006.01) |
| C04B 111/00 | (2006.01) |
| C08F 222/10 | (2006.01) |

(52) U.S. Cl.
CPC ................ *C08K 5/54* (2013.01); *C04B 26/06* (2013.01); *C04B 26/10* (2013.01); *C04B 26/14* (2013.01); *C04B 26/16* (2013.01); *C04B 40/065* (2013.01); *C08G 18/672* (2013.01); *C08G 18/673* (2013.01); *C08K 3/22* (2013.01); *C08K 3/36* (2013.01); *C08L 63/00* (2013.01); *C08L 75/14* (2013.01); *C08L 75/16* (2013.01); *C09J 4/00* (2013.01); *E04B 1/41* (2013.01); C04B 2111/00715 (2013.01); C08F 222/1065 (2020.02); C08F 222/1067 (2020.02); C08K 2003/2227 (2013.01)

(58) Field of Classification Search
CPC ... C08K 5/54; C08K 3/22; C08K 3/36; C08K 2003/2227; C04B 26/06; C04B 26/10; C04B 26/14; C04B 26/16; C04B 40/065; C04B 2111/00715; C08G 18/672; C08G 18/673; C08L 63/00; C08L 75/14; C08L 75/16; C09J 4/00; E04B 1/41; C08F 222/1065; C08F 222/1067
USPC ....................................................... 524/430
See application file for complete search history.

(56) References Cited

U.S. PATENT DOCUMENTS

| | | | |
|---|---|---|---|
| 4,931,490 A | 6/1990 | Armeniades | |
| 4,944,819 A | 7/1990 | Gebauer | |
| 5,531,546 A * | 7/1996 | Herdlicka | ............. E21D 20/026 |
| | | | 524/199 |
| 5,576,108 A | 11/1996 | Neumann et al. | |
| 5,578,685 A | 11/1996 | Neumann et al. | |
| 5,889,125 A | 3/1999 | Neumann et al. | |
| 6,245,143 B1 | 6/2001 | Agus | |
| 7,498,389 B2 | 3/2009 | Vogel et al. | |

(Continued)

FOREIGN PATENT DOCUMENTS

| | | |
|---|---|---|
| CN | 1208397 A | 2/1992 |
| CN | 103339082 B | 8/2015 |

(Continued)

OTHER PUBLICATIONS

European Search Report and Opinion for copending European Application No. 21155567.7 dated May 11, 2021.

(Continued)

*Primary Examiner* — Ling Siu Choi
*Assistant Examiner* — Ronald Grinsted
(74) *Attorney, Agent, or Firm* — Renner, Otto, Boisselle & Sklar, LLP

(57) ABSTRACT

Multi-component synthetic mortar fixing system, especially for fixing anchoring elements in building substrates, which comprises in one component reactive synthetic resins (i) based on urethane (meth)acrylate, (ii) based on epoxy resin or (iii) based on free-radical-hardening (or -hardenable) unsaturated reactive resins, in a further component hardener, and at least one filler selected from oxides of silicon and aluminium, or mixed oxides in the presence of further cations, the d50 average particle size of which is 50 μm or less, and also especially a silane having at least one hydrolysable group, and also its use, methods including its use in fixing anchoring elements in building substrates and related subject-matter.

9 Claims, 1 Drawing Sheet

(56) References Cited

U.S. PATENT DOCUMENTS

| | | | |
|---|---|---|---|
| 7,981,977 B2 * | 7/2011 | Tendou | C08L 63/00 257/793 |
| 8,691,044 B2 | 4/2014 | Grun et al. | |
| 2005/0131106 A1 | 6/2005 | Tonapi | |
| 2006/0045630 A1 | 3/2006 | Buergel et al. | |
| 2008/0287574 A1 * | 11/2008 | Loth | C09J 11/04 524/588 |
| 2009/0273070 A1 | 11/2009 | Tendou et al. | |
| 2011/0073327 A1 | 3/2011 | Buergel | |
| 2012/0308824 A1 | 12/2012 | Matsukubo | |
| 2013/0237634 A1 * | 9/2013 | Buergel | C04B 28/06 523/130 |
| 2014/0309447 A1 | 10/2014 | Standke et al. | |
| 2015/0252124 A1 | 9/2015 | Gaefke et al. | |
| 2015/0307702 A1 | 10/2015 | Grun et al. | |
| 2016/0159690 A1 | 6/2016 | Dureault et al. | |
| 2016/0251263 A1 | 9/2016 | Pfeil et al. | |

FOREIGN PATENT DOCUMENTS

| | | |
|---|---|---|
| DE | 10 2010 051818 B3 | 2/2012 |
| DE | 10 2011 078 785 A1 | 1/2013 |
| DE | 10 2011 086 862 A1 | 5/2013 |
| DE | 10 2012 216 972 B3 | 9/2013 |
| DE | 10 2012 221446 A1 | 5/2014 |
| DE | 10 2013 113 465 A1 | 6/2014 |
| DE | 10 2013 114 061 A1 | 6/2015 |
| EP | 0 150 555 B1 | 8/1985 |
| EP | 0 432 087 A1 | 6/1991 |
| EP | 0 508 183 A1 | 10/1992 |
| EP | 0 645 408 A1 | 3/1995 |
| EP | 0 824 124 A1 | 2/1998 |
| EP | 2 314 556 A2 | 4/2011 |
| EP | 2468791 A1 | 6/2012 |
| EP | 2 826 796 A1 | 1/2015 |
| EP | 2826797 A1 | 1/2015 |
| JP | 2-9738 | 1/1990 |
| JP | 03-177343 A | 8/1991 |
| JP | 2000-169820 A | 6/2000 |
| JP | 2013-527261 A | 6/2013 |
| JP | 2014-503612 A | 2/2014 |
| JP | 5710777 B2 | 4/2015 |
| JP | 2016-508162 A | 3/2016 |
| JP | 2016-532742 A | 10/2016 |
| WO | WO 2005/090433 A1 | 9/2005 |
| WO | WO 2014/090382 A1 | 6/2014 |
| WO | WO 2015/090523 A1 | 6/2015 |

OTHER PUBLICATIONS

Extended European Search Report dated May 11, 2021 for related European Patent Application No. 21155567.7.

Notice of Reexamination dated Apr. 19, 2021 for related Chinese Patent Application No. 201510609861.4 and English translation.

Becker et al., "Polyurethane Kunststoff-Handbuch 7" ("Polyurethane Plastics Handbook 7"), 3rd edition, Carl Hanser Verlag, 1993, pp. 104-111 (cited on p. 9, of the specification).

Lee et al., "Handbook of Epoxy Resins", (New York: McGraw-Hill), 1982, Chapters 7-10 (cited on p. 16 of the specification).

Allowed claims of related parent U.S. Appl. No. 14/860,870, filed Sep. 22, 2015.

Extended European Search Report dated Feb. 17, 2016 for corresponding European Application No. 15401095.3.

European Office Action dated Mar. 22, 2017 for corresponding European Application No. 15 401 095.3.

Japanese Office Action dated Feb. 21, 2019 for corresponding Application No. 2015-185131.

Luo Liqiang, et al., X Ray Fluorescence spectrometer, Chemical Industry Press, Jan. 31, 2008, p. 144 and partial machine translation.

Office Action for related German Application No. 10 2015 113 352.0 dated Jul. 20, 2022.

* cited by examiner

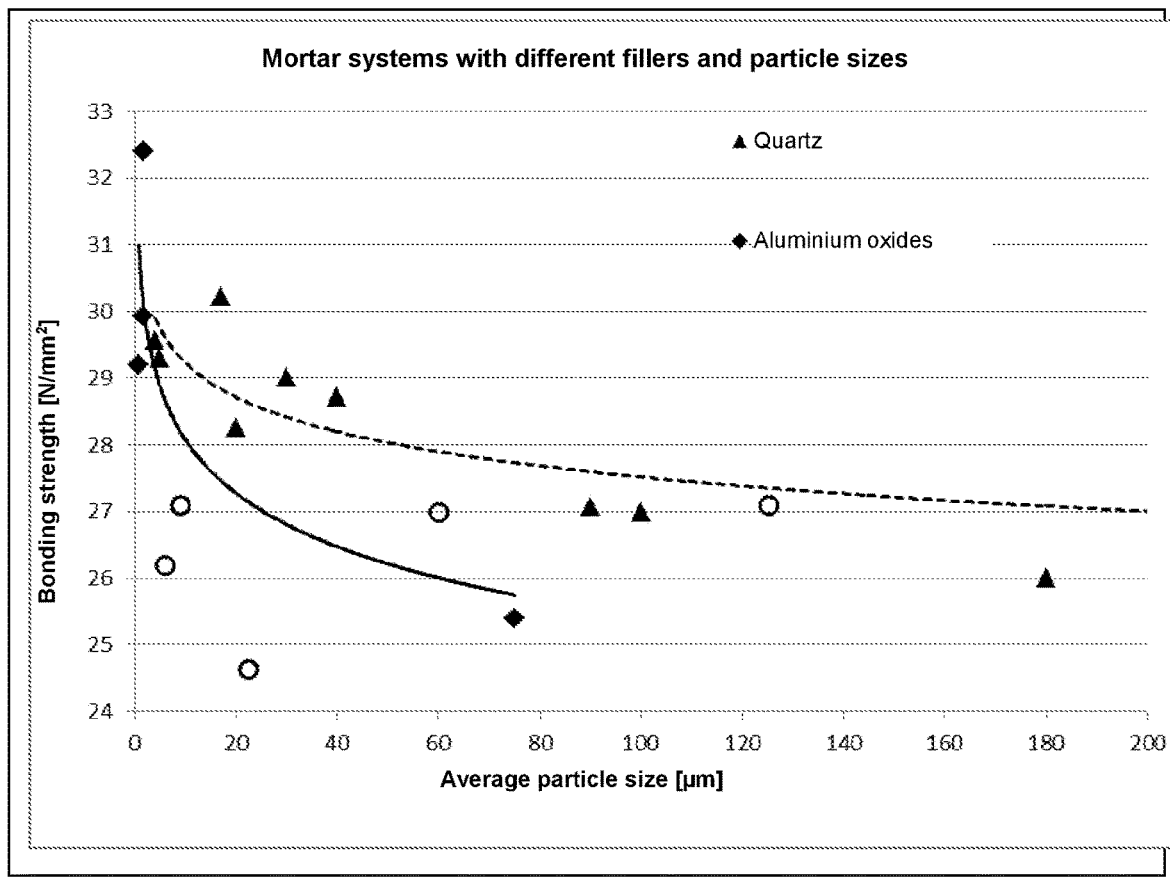

FIXING SYSTEMS HAVING FINE-PARTICLE FILLERS

CROSS-REFERENCE TO RELATED APPLICATION

The present application is a continuation of U.S. patent application Ser. No. 14/860,870, filed Sep. 22, 2015, and claims priority under 35 USC § 119 to German Patent Application Nos. 10 2014 013 800.3, filed on Sep. 23, 2014, and 10 2015 113 352.0, filed Aug. 13, 2015, the entire disclosures of which are incorporated herein by reference.

TECHNICAL FIELD OF THE INVENTION

The invention relates to multi-component synthetic mortar fixing systems, especially for fixing anchoring elements in building substrates, which comprise in one component reactive synthetic resins (i) based on urethane (meth)acrylate (especially preferred), (ii) based on epoxy resin or (iii) based on free-radical-hardening (and/or -hardenable) unsaturated reactive resins and in a further component hardener, as described in further detail hereinbelow, and also to methods for their manufacture and for their use in fixing technology, especially for fixing anchoring elements in building substrates, and also to corresponding methods and multi-component kits.

DESCRIPTION OF THE RELATED ART

In the construction field, additives in the form of fillers in particle form for use in polymer-forming chemical anchoring masses (sometimes also referred to as "chemical anchors") having one or more components, for example in the form of two-chamber cartridges or two-chamber capsules, for fixing anchoring elements in drilled holes, are known. Often, no great importance is attached to the nature of the fillers unless these are of a kind such that, like cement, they themselves contribute to consolidation for example by means of hydraulic binding. Accordingly, for example, EP 0 150 555 B1 explicitly mentions that the nature of the filler is not critical, and a series of possible fillers is mentioned.

It continues to be an ongoing problem to make available fixing systems of a kind which exhibit especially good characteristics such as high tensile and compressive strength and accordingly are able to meet the high demands especially in the area of construction.

It has now been found, surprisingly, that when using fillers having a very small particle size especially good tensile and compressive strengths can surprisingly be achieved compared to those having larger particle sizes.

SUMMARY OF THE INVENTION

The invention accordingly relates, in a first embodiment, to a multi-component synthetic mortar fixing system, especially for fixing anchoring elements in building substrates, which comprises in one component a reactive synthetic resin (i) based on urethane (meth)acrylate (especially preferred), (ii) based on epoxy resin or (iii) based on free-radical-hardening (and/or -hardenable) unsaturated reactive resins and in a further component hardener, characterised in that it comprises at least one filler selected from oxides of silicon (preferred) and aluminium, or mixed oxides in the presence of further cations, the d50 average particle size of which is 50 μm or less, especially 40 μm or less, preferably 30 μm or less, advantageously especially 20 μm or less, for example preferably 10 μm or less, very preferably 5 μm or less, in the best case 2.5 μm or less, in the very best case 1 μm or less.

The subject-matter of the invention also includes use of the multi-component synthetic mortar fixing systems defined in the preceding paragraph (or hereinbelow) in fixing anchoring elements in a hole or crevice in a building substrate.

Methods of fixing an anchoring element in a hole or crevice in a building substrate wherein a multi-component synthetic mortar fixing system according to the invention and an anchoring element are introduced into the hole or crevice and allowed to cure also form subject-matter of the invention.

Finally, the use of at least one filler selected from oxides of silicon (preferred) and aluminium, or mixed oxides in the presence of further cations, the d50 average particle size of which is 50 μm or less, especially 40 μm or less, preferably 30 μm or less, advantageously 25 μm or less, for example preferably 20 μm or less, very preferably 10 μm or less, in the best case 5 μm or less, in the very best case 1 μm or less, as fillers in a multi-component synthetic mortar fixing system as defined hereinabove and hereinbelow for increasing the bonding strength compared to fillers of larger particle size also forms an embodiment of the invention.

BRIEF DESCRIPTION OF THE DRAWING

FIG. 1 (FIG. 1) shows the dependence of the bonding strength on the average particle size of the particles used in Example 1.

DETAILED DESCRIPTION OF THE INVENTION

Advantageously, a synthetic mortar fixing system according to the invention or used in accordance with the invention comprises furthermore, as additive, a silane containing at least one Si-bonded hydrolysable group, or the fillers are, before being added, modified using such a silane, wherein the silane is especially one that has groups that are reactive in the course of polymerisation of the anchoring masses (such as epoxy groups or amino groups, for example for corresponding epoxy-based anchoring masses, or furthermore olefinic double bonds, for example in (meth)acrylate groups, for corresponding free-radical-hardenable anchoring masses), and on the other hand hydrolysable groups bonded to Si, such as alkoxy (for example having from 1 to 7 carbon atoms) or halogen, such as chloro. The surface modification can be present in completed form or be completed in the course of use (for example for fixing anchoring elements) for example using silanes which comprise one or more hydrolysable groups, such as alkoxy-, for example methoxy- or ethoxy, bonded to the silicon atom, for example selected from the group of 3-aminopropyltrialkoxysilanes, such as 3-aminopropyl-trimethoxysilane or 3-aminopropyl-triethoxysilane, 3-glycidyloxypropyltrialkoxysilanes (especially preferred in the case of epoxy-based systems), such as 3-glycidyloxypropyltri-methoxysilane or -ethoxysilane, glycidyloxymethyltrimethoxy-silane, 3-glycidyloxypropylmethyldi-methoxysilane, bis(3-trialkoxysilylpropyl)amine, such as bis(3-trimethoxysilylpropyl)amine or bis(3-triethoxysilylpropyl)amine, 3-mercapto-propyltrialkoxysilane, such as 3-mercaptopropyltrimethoxysilane, and (as a special variant, especially in the case of systems based on unsaturated reactive synthetic resins)) 3-(meth)acryloyl-oxypropyltrialkoxysilanes, such as 3-(meth)acryloyl-oxypropyl-trimethoxysilane or -triethoxysilane or 3-(meth)acryloyloxymethyl-trimethoxysilane or -tri-ethoxysilane, 3-(meth)acryloyl-oxypropylmethyldimethoxysilane and alkenylalkoxysilanes, such as vinylalkoxysilanes, for example vinyltrimethoxysilane or vinyltriethoxysilane, and/or furthermore in all embodiments tetraalkoxysilane, such as tetraethoxysilane, tetra-methoxysilane or tetrapropoxysilane or alkoxypolysilicate (esters of (poly)silicic acid), such as ethyl or propyl polysilicate; or mixtures of two or more thereof. Also, oligomeric silanes, as described in the Application DE 10 2014 109353.4 (filing date: 4 Jul. 2014), which is incorporated herein by reference, can also be used or be formed as a result of reaction with water (water diffusing into the system or residual water).

In special embodiments of the invention, the silane(s) as additive which comprises at least one Si-bonded hydrolysable group or the silane(s) used for modification of the fillers before being added are especially selected from those that have groups that are reactive in the course of polymerisation of the anchoring masses (such as epoxy groups or amino groups (for example for corresponding epoxy-based anchoring masses), and on the other hand hydrolysable groups bonded to Si, such as alkoxy (for example having from 1 to 7 carbon atoms) or halogen, such as chloro. Such silanes which comprise one or more hydrolysable groups, such as alkoxy-, for example methoxy- or ethoxy, bonded to the silicon atom, which are present in completed form or are completed in the course of use (for example for fixing anchoring elements), are for example selected from the group of 3-aminopropyl-trialkoxysilanes, such as 3-aminopropyl-trimethoxysilane or 3-aminopropyl-triethoxysilane, 3-glycidyloxypropyltrialkoxysilanes (especially preferred in the case of epoxy-based systems), such as 3-glycidyloxypropyltri-methoxysilane or -ethoxysilane, glycidyloxymethyltrimethoxy-silane, 3-glycidyloxypropylmethyldi-methoxysilane, bis(3-trialkoxysilylpropyl)amine, such as bis(3-trimethoxysilylpropyl)amine or bis(3-triethoxysilylpropyl)amine, and 3-mercapto-propyltrialkoxysilane, such as 3-mercaptopropyltrimethoxysilane, and/or furthermore in all embodiments tetraalkoxysilane, such as tetraethoxysilane, tetramethoxysilane or tetrapropoxysilane or alkoxypolysilicate (esters of (poly)silicic acid), such as ethyl or propyl polysilicate; or mixtures of two or more thereof.

On the other hand, in specific embodiments of the subject-matter of the invention, 3-(meth)acryloyl-oxypropyltrialkoxysilanes, such as 3-(meth)acryloyl-oxypropyl-tri-methoxysilane or -triethoxysilane or 3-(meth)acryloyl-oxymethyl-trimethoxysilane or -tri-ethoxysilane, 3-(meth)acryloyl-oxypropylmethyldimethoxysilane or futhermore alkenylalkoxysilanes, such as vinylalkoxysilanes, for example vinyltrimethoxysilane or vinyltriethoxysilane can be preferred as such silanes, Such silanes can also be added as such to at least one component of a two-component or multi-component synthetic mortar fixing system. The surface modification can then be produced optionally in the course of the mixing process, storage and/or the intermixing of the components and the subsequent curing during fixing. The silanes having hydrolysable groups can then be provided in an anchoring mass to be used in accordance with the invention in a proportion by weight of from 0.01 to 50, especially 0.1 or more % by weight, such as from 1 to 30% by weight, preferably 2 or more % by weight, such as from 2 to 30 or to 15% by weight, 3 or more % by weight, such as from 3 to 20 or 10% by weight, even more preferably 3.5 or more % by weight, for example from 3.5 to 20 or to 8% by weight.

Hereinabove and hereinbelow it is possible for one, some or all relatively general terms or features to be replaced in each case by more specifically mentioned definitions (especially hereinbelow), resulting in specific, especially preferred, embodiments of the invention.

The d50 average particle size is defined as the particle size at which 50% of the particles by weight are smaller than the stated d50 particle size. There are various and technically generally recognised methods for determining the d50, for example by means of particle size graph determinations customarily using sieves or, for example (especially in the case of relatively smaller particles of less than 1 μm diameter), by means of laser particle size analysis.

The d50 values mentioned in the Examples correspond to manufacturers' data.

Where "a" or "an" is used, this is to be primarily understood (unless otherwise apparent, for example by placing "at least" before it) as the indefinite article and includes "one (1) or more" and also just one (1). In other words, "a" or "an" means "one or more, for example two or three".

Proportions or contents given in percent hereinabove or hereinbelow refer in each case to a percentage by weight ("% by weight") or the relative proportion by weight, relative to all ingredients of a resin composition according to the invention (excluding packaging material), unless otherwise stated or apparent.

"And/or" means that the mentioned features/substances can in each case be present on their own or in a combination of two or more of the individually mentioned features/substances.

"Comprise" or "include" means that other components or features may be present in addition to those mentioned and therefore does not refer to an exhaustive list, unlike "contain", the use of which does signify an exhaustive list of components or features.

Where the attribute "furthermore" is mentioned, this means that features without this attribute can be more preferred.

(Meth)acryl denotes acryl, methacryl or acryl and methacryl (in admixture).

Oxides of silicon (preferably) or aluminium are primarily silicon dioxide (especially preferred) or "aluminium oxide" ($Al_2O_3$). Mixed oxides (furthermore present) are especially oxides thereof in the additional presence of one or more oxides selected from oxides from the group of metals consisting especially of calcium, titanium, iron, sodium or the like. Silicon dioxide, especially quartz, silicates, or aluminium oxide, especially α-aluminium oxide, are especially preferred. Oxides of silicon or mixed oxides of silicon and aluminium are especially preferred, and oxides of silicon even more so.

Excluded are especially gypsum, chalk and aluminium hydroxides as sole fillers, because with these on the basis of results hitherto particle size has not been found to have any influence.

The reactive synthetic resins are preferably defined as follows:
  (i) Examples of urethane (meth)acrylates present in and/or used in special and preferred embodiments of the invention in reactive synthetic resins based on urethane methacrylate ("vinyl ester urethanes") in synthetic resin mortar systems according to the invention are those which result on the one hand from reaction of a prelengthened monomeric di- or poly-isocyanate and/or on the other hand from reaction of a polymeric di- or poly-isocyanate (for example: PMDI, MDI) with hydroxyalkyl (meth)acrylate, such as hydroxyethyl or hydroxypropyl (meth)acrylate. The way in which prelengthening reactions are carried out and the multiplicity of prelengthening reaction possibilities are known to the skilled person and will not all be described explicitly herein. By way of example reference is made here to the Applications EP 0508183 A1, EP 0432087 A1, and the Application as yet not laid open to public inspection of 14.02.2014 having the Application No. DE 10 2014 101 861.3.

A special embodiment relates to those urethane (meth) acrylate resins which can be produced (which are capable of being produced or especially which are produced) by the method set out in DE 10 2013 101 861.3 or analogously thereto, which is briefly described hereinbelow:

This relates to a method for producing vinyl ester urethane resins, especially urethane (meth)acrylate resins (hereinbelow also referred to as U(M)A resins), which is characterised in that, as starting material for the production of the vinyl ester urethane resin, especially U(M)A resin, an isocyanate having an average functionality of 2 or less or especially more than 2 (which can also be obtained by mixing isocyanates of a functionality of less than two with isocyanates of a functionality of more than 2), for example from 2.0 or especially 2.1 to 5, for example from 2.2 to 4, advantageously, for example, from 2.3 to 3.5, is reacted with an aliphatic alcohol having at least one C—C double bond (non-conjugated—olefinic bond), especially a hydroxyalkyl (meth)acrylate, preferably hydroxy-lower alkyl (meth)acrylate, such as hydroxyethyl (meth)acrylate or especially hydroxypropyl (meth)acrylate, preferably 2-hydroxypropyl methacrylate (HPMA). The HPMA available in technical form is to be seen in this context as a mixture of 2-hydroxypropyl methacrylate and hydroxyisopropyl methacrylate, —other aliphatic alcohols having an olefinic bond can also be present as technical isomer mixtures or as pure isomers.

An isocyanate having an average functionality of less than 2 or 2 or especially more than 2, for example from 2.1 to 5, for example from 2.2 to 4, advantageously, for example, from 2.3 to 3.5, is, for example, a polyisocyanate with uretdione, isocyanurate, iminooxadiazinone, uretonimine, biuret, allophanate and/or carbodiimide structures (advantageously with a molecular weight distribution such that no single molecule species is present in an amount of more than 50% by weight and at the same time more than 50% by weight of the chains are composed of at least 3+1 covalently bonded monomer units/reactants (see the more precise definition of a polymer according to REACH)) or preferably a mixture (for example typically formed in technical preparation processes or subsequently then specifically adjusted (for example by adding and/or distilling off monomers or monomer mixtures)) of (i) one or more monomeric mono- or especially di-isocyanates, such as diphenylmethane diisocyanate (MDI), especially 4,4'-diphenylmethyl diisocyanate or 2,2'-diphenylmethane diisocyanate or mixtures of diphenylmethane diisocyanate isomers (with different positions of the isocyanate groups on the phenyl nuclei), such as those just mentioned, with (ii) one or more "polymeric" diphenylmethane diisocyanates (PMDI), that is to say preferably crude MDI (crude product of the industrial production of MDI without separation of the individual isomers, for example by distillation) with (that is to say comprising) a plurality of isomeric and higher-functional homologues and, for example, an average molecular weight in an order of magnitude of from 200 to 800 g/mol and a functionality as indicated above, for example having an average molecular weight of from 280 to 500, for example from 310 to 480 and a functionality of from 2.4 to 3.4, for example of 3.2. Preference is given to commercially available PMDI that are obtained from the crude MDI itself or from the crude MDI, for example by distilling off and/or adding monomeric MDI, and have an average molecular weight of 310-450 and can also comprise uretdione, isocyanurate, iminooxadiazinone, uretonimine, biuret, allophanate and/or carbodiimide structures. Special preference is given to commercially available PMDI having a molecular weight distribution such that no individual molecule species is present in an amount of more than 50% by weight.

"Functionality" is to be understood as being the number of isocyanate groups per molecule; in the case of diphenylmethane diisocyanate this functionality is (substantially, that is to say apart from impurity-related variations) 2; in the case of the PMDI, it is an average functionality (generally indicated by the manufacturer) which can be calculated according to the formula $$f = \frac{\sum n_i \cdot f_i}{\sum n_i}$$

($f$=functionality, $n_i$=number of molecules of a functionality $f_i$)

and is preferably between less than 2 or 2 or especially preferably more than 2, for example 2.1, and 5.0 or in the ranges as indicated above.

The method for production of urethane (meth)acrylate resins takes place preferably in the presence of a catalyst; appropriate catalysts which catalyse the reaction between hydroxyl groups and isocyanate groups are adequately known to the skilled person, for example a tertiary amine, such as 1,2-dimethylimidazole, diazabicyclooctane, diazabicyclononane, or an organometallic compound (for example of K, Sn, Pb, Bi, Al and especially also of transition metals such as Ti, Zr, Fe, Zn, Cu); and also mixtures of two or more therof; for example in a proportion (relative to the reaction mixture) of from 0.001 to 2.5% by weight, preferably in the presence of stabilisers (inhibitors), such as, for example, phenothiazine, TEMPO, TEMPOL, hydroquinone, dimethylhydroquinone, triphenyl phosphite, tert-butyl hydroquinone, hydroquinone monoethyl ether, tert-butyl pyrocatechol and/or p-benzoquinone, and also mixtures of two or more thereof; for example, in an amount of from 0.0001 to 2.5% by weight, relative to the reaction mixture, at preferred temperatures for example in the range from 0 to 120° C., advantageously from 50 to 95° C.

Examples of suitable catalysts and stabilisers are known to the skilled person, for example as can be found from "Polyurethane Kunststoff-Handbuch 7" by Becker, G. W.; Braun, D.; Oertel, G., 3rd Edition, Carl Hanser Verlag, 1993.

The reaction can be carried out without solvent (the aliphatic alcohol having at least one C—C double bond, especially the hydroxy-(lower)alkyl (meth)acrylate, then itself serves as solvent) or in the presence of a suitable solvent, for example a further reactive diluent. "Reactive" here relates to the formulation of the adhesive composition and the curing thereof, not to the addition of the alcohol to the isocyanate.

The reaction can also be carried out in such a way that, by means of a prelengthening step, a prepolymer is formed and only afterwards are the isocyanate groups still remaining reacted with the aliphatic alcohol having at least one C—C double bond, especially the hydroxy-(lower)alkyl (meth) acrylate, as described hereinabove or hereinbelow.

For the preparation of the prepolymer there are used, to achieve an average isocyanate functionality of less than 2, 2 or especially more than 2, the above-mentioned isocyanates and polyols having two or more hydroxy groups per molecule and/or polyamines having two or more amino groups per molecule or aminols having two or more amino and hydroxy groups per molecule; or isocyanates having a functionality of 2 with polyols, polyamines or aminols having an average OH and/or amino functionality of more than 2 are used.

Polyols (di- or higher-functional alcohols) here are especially di- or higher-functional alcohols, for example secondary products of ethylene oxide or propylene oxide, such as ethanediol, di- or tri-ethylene glycol, propane-1,2- or -1-3-diol, dipropylene glycol, other diols, 1,2-, 1,3- or 1,4-butanediol, 1,6-hexanediol, neopentyl glycol, 2-ethylpropane-1,3-diol or 2,2-bis(4-hydroxycyclohexyl)-propane, triethanolamine, bisphenol A or bisphenol F or the oxyethylation, hydrogenation and/or halogenation products thereof, higher-valent alcohols, such as, for example, glycerol, trimethylolpropane, hexanetriol and pentaerythritol, hydroxyl-group-containing polyethers, for example oligomers of aliphatic or aromatic oxirans and/or higher cyclic ethers, for example ethylene oxide, propylene oxide, styrene oxide and furan, polyethers having terminal hydroxy in each case which contain aromatic structural units in the main chain, for example those of bisphenol A or F, hydroxyl-group-containing polyesters based on the above-mentioned alcohols or polyethers and dicarboxylic acids or their anhydrides, for example adipic acid, phthalic acid, isophthalic acid, terephthalic acid, tetra- or hexa-hydrophthalic acid, endomethylenetetrahydrophthalic acid, maleic acid, fumaric acid, itaconic acid, sebacic acid or the like. Special preference is given to hydroxyl compounds having aromatic structural units having a chain-stiffening effect, hydroxy compounds having unsaturated components for increasing the crosslinking density, such as fumaric acid, or branched or star-shaped hydroxy compounds, especially tri- or higher-functional alcohols and/or polyethers or polyesters that contain structural units thereof. Special preference is given to lower alkanediols (yielding —O-lower alkylene-O— divalent radicals).

Aminols (aminoalcohols) are compounds that contain especially one or more hydroxy groups and one or more amino groups in one and the same molecule. Preferred examples are aliphatic aminols, especially hydroxy-lower alkylamines (yielding —NH-lower alkylene-O— or —O-lower alkylene-NH— radicals), such as ethanolamine, diethanolamine or 3-aminopropanol, or aromatic aminols, such as 2-, 3- or 4-aminophenol.

Polyamines (di- or higher-functional amines) are organic amino compounds having 2 or more amino groups, especially hydrazine, N,N'-dimethylhydrazine, aliphatic di- or poly-amines, especially lower alkanediamines (yielding —NH-lower alkyl-NH— radicals), such as ethylenediamine, 1,3-diaminopropane, tetra- or hexa-methylenediamine or diethylene-triamine, or aromatic di- or poly-amines, such as phenylenediamine, 2,4- and 2,6-toluenediamine, or 4,4'-diaminodiphenylmethane, polyether diamines (polyethylene oxides having terminal amino groups) or polyphenyl/polymethylene-polyamines that are obtainable by condensation of anilines with formaldehyde.

The ratio of free isocyanate groups of the isocyanate(s) to hydroxy groups of the hydroxy-lower alkyl (meth)acrylate (s) is advantageously so selected that rapid and complete reaction of the isocyanate groups is obtained, that is to say the molar amount of hydroxy groups (and accordingly the correlating molar amount of hydroxy-lower alkyl (meth) acrylate) is greater than the molar amount of isocyanate groups, for example from 1.03 to 5 times greater, such as, for example, from 1.05 to 4 times greater or from 1.1 to 3 times greater. Excess hydroxy-lower alkyl (meth)acrylate serves as reactive diluent.

The U(M)A resins obtainable by means of the method are those which constitute urethane (meth)acrylate resins usable or present according to the invention in the reactive synthetic resins based on urethane (meth)acrylate.

"Based on urethane (meth)acrylate" means especially that the synthetic mortar fixing systems according to the invention, in addition to comprising the constituents already mentioned, can also comprise further customary constituents (for example additives or other constituents mentioned hereinabove or hereinbelow). These further constituents can be present, for example, in an amount of, in total, up to 80% by weight, preferably between 0.01 and 65% by weight. Even when "based on" is not explicitly mentioned, such customary constituents are also possible.

Examples of further ingredients of reactive synthetic resins based on urethane (meth)acrylate and/or synthetic mortar fixing systems comprising them are here metal-salt-based or preferably aminic accelerators, inhibitors, non-reactive diluents, reactive diluents, thixotropic agents, further fillers to those used in accordance with the invention and/or further additives, or mixtures of two or more such ingredients.

As metal-salt-based accelerators there come into consideration Cu, Co, Mn, Sn or Ce salts, such as, for example, copper octanoate. As aminic accelerators there come into consideration those having sufficiently great activity, such as especially (preferably tertiary, especially hydroxyalkylamino-group-substituted) aromatic amines selected from the group selected from epoxyalkylated anilines, toluidines or xylidines, such as, for example, ethoxylated toluidine, aniline or xylidine, for example N,N-bis(hydroxypropyl or hydroxyethyl)-toluidines or -xylidines, such as N,N-bis(hydroxypropyl or hydroxyethyl)-p-toluidine, N,N-bis(hydroxyethyl)-xylidine and very especially corresponding higher alkoxylated technical products. One or more such accelerators are possible. The accelerators preferably have a content (concentration) of from 0.005 to 10%, especially from 0.1 to 5% by weight.

As inhibitors there can be added, for example, non-phenolic (anaerobic) and/or phenolic inhibitors.

As phenolic inhibitors (which are often provided as a constituent already mixed in with commercial free-radical-hardening reactive resins but which, furthermore, may also be absent) there come into consideration (non-alkylated or alkylated) hydroquinones, such as hydroquinone, furthermore mono-, di- or tri-methyl hydroquinone, (non-alkylated or alkylated) phenols, such as 4,4'-methylene-bis(2,6-di-tert-butylphenol), 1,3,5-trimethyl-2,4,6-tris(3,5-di-tert-butyl-4-hydroxybenzyl)-benzene, (non-alkylated or alkylated) pyrocatechols, such as tert-butyl-pyrocatechol, 3,5-di-tert-butyl-1,2-benzenediol or, or especially 4-methoxyphenol, or mixtures of two or more thereof. These have preferably a content of up to 1% by weight, especially if present between 0.0001 and 0.5% by weight, for example between 0.01 and 0.1% by weight.

As non-phenolic or anaerobic (that is to say, unlike the phenolic inhibitors, active also without oxygen) inhibitors (which especially have scarcely any effect on the curing times) there come into consideration preferably phenothiazine or organic nitroxyl free radicals. As organic nitroxyl free radicals there can be added, for example, those described in DE 199 56 509, which is incorporated herein by reference especially in respect of the compounds mentioned therein, especially 1-oxyl-2,2,6,6-tetramethylpiperidin-4-ol ("4-OH- TEMPO" or "TEM POL"). The proportion by weight of the non-phenolic inhibitors is (if present) preferably in the range of from 1 ppm (by weight) to 2% by weight, especially, for example, in the range of from 5 ppm to 1% by weight, relative to the reactive resin formulation.

As non-reactive diluents there can be added, for example, vegetable oils, such as castor oil, or furthermore bio-alcohols and fatty acids and esters thereof, or mixtures of two or more thereof, for example in a proportion of from 3 to 60% by weight, for example from 4 to 55% by weight.

As thixotropic agents there can be used customary thixotropy-imparting rheology aids, such as pyrogenic silica or silica that has been surface-treated (for example, with silanes). They can be added, for example, in a proportion by weight of from 0.01 to 50% by weight, for example from 0.5 to 20% by weight.

As further fillers that can be used besides the fillers according to the invention there can be used furthermore customary fillers having a greater average particle size, especially chalks, quartz sand, quartz powder, corundum or the like, which can be added in the form of powder in granular form or in the form of shaped bodies, or others, such as kernel or shell flours obtained from plants, which increases the biogenic carbon content, such as olive stone flour, coconut shell flour or furthermore walnut shell flour, or also hydraulic fillers, as described hereinabove under the epoxides, or mixtures thereof, it being possible for the fillers furthermore or especially also to be silanised. The fillers can be present in one or more components of a multi-component synthetic mortar fixing system according to the invention, for example one or both components of a corresponding two-component kit; the content of fillers is preferably from 0 to 90% by weight, for example from 10 to 50% by weight (in the case of the installation of anchoring elements, broken casing material (for example splintered glass or splintered plastics), for example fragments of capsules, can also be counted as filler). In addition or as an alternative to one or more of the mentioned fillers, furthermore, hydraulically hardenable fillers, such as gypsum, burnt lime or cement (for example alumina cement or Portland cement), water glasses or active aluminium hydroxides, or two or more thereof, can be added.

As further fillers there can be used customary fillers, especially cements (for example Portland cements or alumina cements), chalks, sand, quartz sand, quartz powder or the like, which can be added in the form of powder, in granular form or in the form of shaped bodies, or mixtures of two or more thereof, it being possible for the fillers furthermore or especially also to be silanised.

Further additives can also be added, such as plasticisers, non-reactive diluting agents, flexibilisers, stabilisers, rheology aids, wetting and dispersing agents, colouring additives, such as dyes or especially pigments, for example for staining the components different colours for better monitoring of their intermixing, or the like, or mixtures of two or more thereof. Such further additives can preferably be added in total in proportions by weight of in total from 0 to 90%, for example from 0 to 40% by weight.

As "reactive diluents" it is possible, in addition, also for one or more free-radical-hardening unsaturated reactive diluents in biogenic or non-biogenic form to be added, which are to be understood primarily as those which, as free-radical-curing (which includes "curable (for example prior to addition of hardener)") components, organic compounds having unsaturated (for example, olefinic) radicals or which especially consist of such compounds, for example especially (meth)acrylate or (meth)acrylamide monomers, such as acrylic acid and/or methacrylic acid or preferably esters thereof (referred to as (meth)acrylates) or amides, especially (meth)acrylates such as mono-, di-, tri- or poly-(meth)acrylates (including hydroxy-lower alkyl (meth)acrylates, which can also be present already as reactive diluents in the event of an excess from the U(M)A resin production according to the invention, such as hydroxypropyl (meth)acrylate or hydroxyethyl (meth)acrylate, alkyl (meth)acrylates having 1 to 10 (meth)acrylate groups, such as mono-, di-, tri-, tetra-, penta-, hexa- or poly-(meth)acrylates, for example alkyl di- or tri-(meth)acrylates, such as 1,2-ethanediol di(meth)acrylate, butanediol di(meth)acrylate, such as 1,3- or especially 1,4-butanediol di(meth)acrylate, hexanediol di(meth)acrylate, 1,10-decanediol di(meth)acrylate, diethylglycol di(meth)acrylate, especially preferably oligoalkylene glycol di(meth)acrylates, as described in DE 10 2014 109355.0 (filing date 4 July 2014), which is incorporated herein by reference, trimethylolpropane tri(meth)acrylate, glycerol tri(meth)acrylate, polyglycerol poly(meth)acrylate, polyethylene glycol di(meth)acrylate, cycloalkyl (meth)acrylates, bicycloalkyl (meth)acrylates or heterocyclyl (meth)acrylates, wherein cycloalkyl or bicycloalkyl furthermore can be substituted and has from 5 to 7 ring carbon atoms and heterocyclyl has 5 or 6 ring atoms, furthermore can bear substituents and has 1 or 2 ring hetero atoms selected from N, O and S, such as tetrahydrofurfuryl (meth)acrylate or isobornyl (meth)acrylate, or acetacetoxyalkyl (meth)acrylate; or furthermore styrenes, such as styrene, α-methyl styrene, vinyl toluene, tert-butyl styrene and/or divinyl benzene; or mixtures of two or more thereof, to be provided as constituents that cure in parallel with the free-radical-hardening unsaturated reactive resin, for example (if present) in a proportion by weight of from 0.1 to 90% by weight, for example between 10 and 80% by weight, 30 to 70% by weight or 40 to 60% by weight, in each case relative to the total weight of the mixture of vinyl ester urethane resin and reactive diluent excluding fillers but, where applicable, including other additives.

The mentioned free-radical-hardenable oligoalkylene glycol di(meth)acrylates are especially those of formula I,

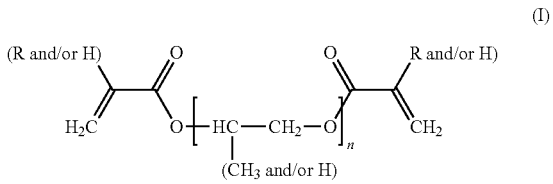

(I)

wherein the radicals R independently of one another denote $C_1$-$C_7$alkyl, especially methyl, and wherein n denotes on average 2.5 to 13, preferably 3.5 to 10, especially 4 to 8 and above all 4.2 to 7, especially 4.5 and 6.

Examples of corresponding compounds are especially triethylene glycol di(meth)acrylate (TIEGDMA), tetraethylene glycol di(meth)acrylate (TTEGDMA), polyethylene glycol 200-di(meth)acrylate (PEG200DMA) (average n≈4.5) (most preferred), polyethylene glycol 400-di(meth)acrylate (PEG400DMA) (average n=9), furthermore polyethylene glycol 600-di(meth)acrylate (PEG600DMA) (average n=13).

(ii) The reactive synthetic resins based on epoxy that can be utilised in use of and/or provided in synthetic mortar fixing systems according to the invention comprise an epoxy component, preferably based on glycidyl compounds, for example those having an average glycidyl group functionality of 1.5 or more, especially of 2 or more, for example from 2 to 10, which can optionally comprise further glycidyl ether(s) as reactive diluent. The epoxides of the epoxy component are preferably poly(including di)-glycidyl ethers of at least one polyhydric alcohol or phenol, such as novolak, bisphenol F or bisphenol A, or mixtures of such epoxides, for example obtainable by reaction of the corresponding polyhydric alcohols with epichlorohydrin. Examples are trimethylolpropane triglycidyl ether, novolak epoxy resins, bisphenol A epichlorohydrin resins and/or bisphenol F epichlorohydrin resins, for example having an average molecular weight of <2000. The epoxy resins can have, for example, an epoxy equivalent of from 120 to 2000, preferably from 130 to 400, such as especially from 155 to 195, for example from 165 to 185. The proportion of the epoxy component of the synthetic mortar fixing system is preferably from 5 to below 100% by weight, especially from 10 to 80% by weight, from 10 to 70% by weight, or from 10 to 60% by weight. Also possible are mixtures of two or more of such epoxy components. Suitable epoxy resins, reactive diluents and hardeners are also to be found in the reference work by Lee H and Neville K, "Handbook of Epoxy Resins" (New York: McGraw-Hill), 1982 (these compounds are incorporated herein by reference).

"Based on epoxy" means especially that the synthetic mortar fixing systems according to the invention can also comprise, in addition to the components mentioned hitherto, further customary constituents (for example, additives or other constituents mentioned hereinabove or hereinbelow). These further constituents can be present, for example, in an amount of, in total, up to 80% by weight, preferably between 0.01 and 65% by weight. Even when "based on" is not explicitly mentioned, such customary ingredients are possible.

Important examples of further constituents are one or more selected from accelerators, reactive diluents, thixotropic agents, further fillers besides the fillers present and/or used in accordance with the invention, and further additives.

As accelerators there may be included, for example, tert-amines, such as imidazoles or tert-aminophenols, such as tris-2,4,6-dimethylaminomethylphenol, organophosphines or Lewis bases or Lewis acids, such as phosphoric acid esters, or mixtures of two or more thereof, in one or (especially in the case of multi-component systems) more of the components, preferably in each case in a hardener component, for example in a proportion by weight of from 0.001 to 15% by weight.

As thixotropic agents there can be used customary rheology aids, such as pyrogenic silica. They can be added, for example, in a proportion by weight of from 0.001 to 50% by weight, for example from 1 to 20% by weight.

As further fillers there can be used furthermore fillers as mentioned hereinabove for the urethane methacrylate resins.

Further additives can also be added or included, such as plasticisers, non-reactive diluting agents, flexibilisers, rheology aids, wetting agents, colouring additives, such as dyes or especially pigments, for example for staining the components different colours for better monitoring of their intermixing, or the like, or mixtures of two or more thereof. (Residual) water contents are likewise not excluded here. Further substances may also enter during storage, such as, for example, gases or especially substances in the gaseous aggregate state. Such further additives can preferably be added in total in proportions by weight of in total from 0 to 90%, for example from 0 to 40% by weight.

Some of the compounds mentioned in the definition of epoxides, such as trimethylolpropane triglycidyl ether or hexanediol diglycidyl ether, which have a lower viscosity than epoxides comprising aromatic groups, can also be used as reactive diluents, for example in a proportion by weight of from 0.1 to 90% by weight, for example between 0.5 and 75% by weight or between 1 and 40% by weight.

Also possible are mixtures of two or more of such reactive diluents of the same or also, optionally, different epoxy functionality.

The hardener comprises at least one compound customary for epoxy hardening (reaction partner in polyaddition), the term "hardener" meaning preferably at least one compound which is customary for epoxy hardening with or without addition of fillers and/or further additives such as water, thickeners and/or further additional substances, in other words the complete hardener component. The hardener can be in the form of a separate component and/or also be incorporated (especially in protected form, that is to say, for example, in micro-encapsulated form) in the reactive resin formulation (in the form of a hardenable component, that is to say one which, after mixing with the hardener after breaking-open of the shell of the microcapsule, cures by means of polymerisation). Customary additives can be added such as, for example, fillers (especially as defined hereinabove) and/or solvents (especially for producing a paste or emulsion), such as benzyl alcohol and/or water, it being possible for water to serve as reaction partner for the hydrolysis of silanes or siloxanes comprising hydrolysable groups, and water preferably being present only when the hardener component is otherwise free of silanes or siloxanes. The further additives of the hardener component of an epoxy-based synthetic mortar fixing system according to the invention can be provided, for example, in a proportion by weight of in total from 0.01 to 70% by weight, for example from 1 to 40% by weight, relative to the hardener component The compounds customary for epoxy hardening (which function as reaction partners in the course of polyaddition) are especially those having two or more groups selected from amino, imino and mercapto, for example corresponding amines (preferred), thiols or aminothiols, or mixtures thereof, for example as mentioned in Lee H and Neville K, "Handbook of Epoxy Resins" (New York: McGraw-Hill), 1982, which is hereby incorporated by reference in this regard, for example di- or poly-amines and/or di- or poly-thiols which are mentioned therein. Preferably, the compounds customary for epoxy hardening have no rubber modification or other impact modifiers (such as, for example, amino-functionalised butadiene polymers or butadiene-acrylonitrile polymers).

The compounds customary (generally) for epoxy hardening include, for example in an embodiment of the invention
di- or poly-amines such as especially aliphatic (such as ethylenediamine), heteroaliphatic (such as 4,9-dioxadodecane-1,12-diamine), cycloaliphatic (such as 1,3-bis(aminomethyl)-cyclohexane), cycloheteroaliphatic (such as am inoethylpiperazine), araliphatic (such as meta-xylylene-diamine) and aromatic di- or poly-amines, amidoamines, amine adducts (for example: Bucherer adducts as disclosed in the publication EP 0 824 124), polyether diamines or polyphenyl/polymethylenepolyamines, Mannich bases (especially as disclosed in the publication WO 2005/090433, especially on page 3 last paragraph to page 6 second paragraph, as in Example 1 or especially 2 thereof, or as in the publication EP 0 645 408 or especially those based on certain amines and styrenated phenols or precursors thereof in the form of mixtures of styrenated phenols with low-molecular-weight amines, which are disclosed in German Patent Application DE 10 2013

113 465.3, also published as WO 2014/090382, which are incorporated herein by reference in this regard, that is to say electrophilic substitution products of phenols (for example, phenol, pyrocatechol, resorcinol, hydroquinone, hydroxyhydroquinone, phloroglucinol, pyrogallol, o-cresol, m-cresol or p-cresol, especially phenol) with styrene or styrene analogues, such as vinyl toluene, divinyl benzene or 4-vinyl pyridine, especially with styrene, for example styrenated phenol, styrenated resorcinol, styrenated bisphenol A or styrenated bisphenol F; on their own or in admixture with one or more further di- or poly-amines), polyamides and the like;

di- or poly-thiols such as, for example, ethoxylated and/or propoxylated alcohols from mono-, di-, tri-, tetra-, penta-ols and/or other polyols having thiol end groups (for example, Capcure 3-800 from the company Cognis) and/or such as, especially, thiols comprising ester groups.

For example, they may be esters of α-mercaptoacetate or β-mercaptopropionate with diols, triols, tetraols, pentaols or other polyols.

"Aliphatic" therein can denote, for example, from 1 to 20 chain atoms (carbon or (for example, from 1 to 3) hetero atoms selected independently of one another from O, S and N).

Mixtures of two or more of the mentioned compounds customary for epoxy hardening can also be used and/or included.

The compounds customary for epoxy hardening are present preferably in amounts of up to 95% by weight, preferably from 2 to 70% by weight, for example from 10 to 50%.

Relative to the hardener component, the proportion of those compounds in a possible preferred embodiment of the invention is from 1 to 100% by weight, for example 3 to 95% by weight, e.g. 4 to 95% by weight, 5 to 90% by weight or 10 to 80% by weight.

(iii) Free-radical-hardening (or hardenable) unsaturated reactive synthetic resins are to be understood as being primarily those which comprise, as free-radical-curing (which includes "curable (for example prior to addition of hardener)") components, organic compounds having unsaturated (for example olefinic) radicals or, especially, which consist thereof, especially those which include hardenable esters with unsaturated carboxylic acid radicals; for example, especially, (meth)acrylate or (meth)acrylamide monomers, such as acrylic acid and/or methacrylic acid or, preferably, esters (referred to as (meth)acrylates) or amides thereof, especially meth (acrylates), such as mono-, di-, tri- or poly-(meth) acrylates (including hydroxypropyl (meth)acrylate, hydroxyethyl (meth)acrylate, ethylene glycol di(meth) acrylate, butanediol di(meth)acrylate, hexanediol dimethacrylate, especially preferably oligoalkylene glycol di(meth)acrylates as described hereinabove or in DE 10 2014 109355.0 (especially as mentioned hereinabove under Formula I), or (preferably in each case propoxylated or, especially, ethoxylated) aromatic diol-, such as bisphenol-A-, bisphenol-F- or novolak-(especially di-)(meth)acrylate), epoxy(meth)acrylates (especially in the form of reaction products of di- or poly-epoxides, for example bisphenol-A-, bisphenol-F- or novolak-di- and/or -poly-glycidyl ethers, with unsaturated carboxylic acids, for example $C_2$-$C_7$ alkenecarboxylic acids, such as especially (meth) acrylic acid), urethane (meth)acrylates and/or urea (meth)acrylates (which, as is known to the skilled person, also includes prelengthened and/or oligomeric urethane (meth)acrylates and/or urea (meth)acrylates), and/or unsaturated polyester resins, or the like; or a mixture of two or more of such hardenable unsaturated organic components.

Examples of epoxy(meth)acrylates present or used in special embodiments of the invention are those of formula

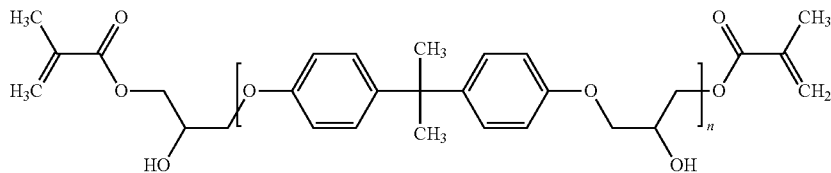

wherein n denotes a number greater than or equal to 1 (when mixtures of different molecules having different n values are present and are represented by the formula, non-integer numbers are also possible as a mean value).

Examples of propoxylated or, especially, ethoxylated aromatic diol-, such as bisphenol-A-, bisphenol-F- or novolak-(especially di-)(meth)acrylates that are useful in special embodiments of the invention are those of formula

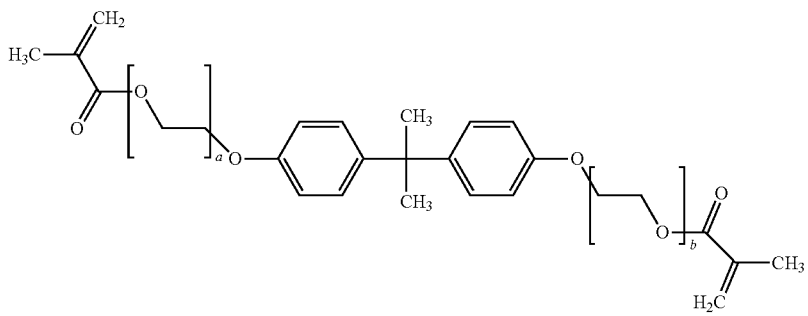

wherein a and b each independently of the other denote a number greater than or equal to 0, with the proviso that preferably at least one of the values is greater than 0, preferably both values being 1 or more (when mixtures of different molecules having different (a and b) values are present and are represented by the formula, non-integer numbers are also possible as a mean value).

Important examples of further ingredients here are aminic accelerators, inhibitors, non-reactive or further (except for biogenic) reactive diluents, thixotropic agents, further fillers to those according to the invention and/or further additives.

As reactive or non-reactive diluents, accelerators, inhibitors, thixotropic agents, additives, fillers or further fillers and further ingredients there come into consideration all those already mentioned under (i).

The hardener for reactive synthetic resins according to (i) and (iii) includes at least one peroxide as actual initiator. The term "hardener" here preferably hereinabove and hereinbelow means pure initiators or stabilised initiators, with or without addition of filler, and/or further additives, such as water, thickeners and/or further additional substances, such as dyes, pigments, additives and the like, in other words the complete hardener component. For stabilisation, customary additives, such as gypsum, chalk, pyrogenic (preferably surface-treated, for example surface-treated to be made hydrophobic) silica, phthalates, chlorinated paraffin or the like, can be added. In addition, fillers and/or (especially for the preparation of a paste or emulsion) solvents (non-reactive diluents such as, for example, liquid (for example, epoxidised or hydroxyl-group-containing) oils, for example castor oil, or water, thickeners, fillers (for example those mentioned above) and further additives of those mentioned above can also be added. The content of all additives can be, for example, a proportion by weight of in total from 0.1 to 99.5% by weight, for example from 1 to 99.5% by weight.

As initiator for the hardening of the reactive resin formulations according to the invention there are used in the case of free-radical-polymerisation, for example free-radical-forming peroxides, for example, organic peroxides, such as diacyl peroxides, for example dibenzoyl peroxide, ketone peroxides, such as methyl ethyl ketone peroxide or cyclohexanone peroxide, or alkyl peresters, such as tert-butyl perbenzoate, inorganic peroxides, such as persulfates or perborates, and also mixtures thereof.

Alternatively, for the hardening of the synthetic mortar fixing systems according to the invention there can be used a hardener system which comprises the constituents:

a) at least one activator in the form of a metal salt b) at least one compound comprising thiol and/or thiol ester groups as free-radical chain starter, as initiators. As a result of the combination and/or mixing of the two constituents free radicals can be formed which, instead of hitherto customary free-radical-formers (for example, peroxides), can initiate polymerisation of non-aromatic double bonds, for example olefinic double bonds, for instance acrylates or methacrylates. Reference is made here to Patent Application DE 10 2013 114 061.0 of 16.12.2013, which is incorporated herein in this regard by reference.

Likewise alternatively, there can be used and/or provided as hardener system a system which comprises the following constituents as initiator:

a) at least one activator in the form of a metal salt and b) at least one CH-acid compound of formula I as free-radical chain starter

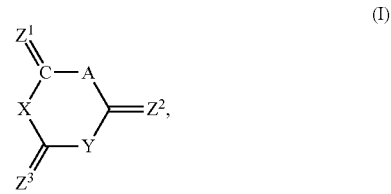

wherein
(i)
-A- denotes —C(R$^1$)(R$^2$)—,
—X— denotes a bond, —NR$^3$— or —(CR$^4$R$^5$)$_p$—, or denotes —O—,
Y denotes NR$^6$ or (CR$^7$R$^8$)$_q$, or denotes O,
wherein when X denotes O, Y also denotes O;
wherein, preferably, X denotes (CR$^4$R$^5$)$_p$ and Y denotes CR$^7$R$^8$,
or X denotes NR$^3$ and Y denotes NR$^6$;
Z$^1$ denotes O, S, S=O or S(=O)$_2$,
Z$^2$ denotes O, S, S=O or S(=O)$_2$,
Z$^3$ denotes O, S, S=O or S(=O)$_2$ or R$^9$ and R$^{10}$,
p denotes 1, 2 or 3, preferably 1 or 2,
q denotes 1, 2 or 3, preferably 1;
and the radicals R$^1$, R$^2$, R$^3$, R$^4$, R$^5$, R$^6$, R$^7$ R$^8$, R$^9$ and R$^{19}$ independently of one another denote hydrogen, alkyl, aryl, aralkyl, cycloalkyl or cycloalkylalkyl and are each unsubstituted or substituted and/or include hetero atoms (instead of C atoms;
preferably selected from O, N, such as NH or N-alkyl, and S), with the proviso that at least one of the radicals R$^1$ and R$^2$ denotes hydrogen, or
(ii) open-chain compounds
wherein the bridging member —C(=Z$^3$)— is missing,
-A- denotes —C(R$^1$)(R$^2$)—, X and Y independently of one another denote a C$_1$-C$_4$alkyl group or C$_1$-C$_4$alkoxy group or C$_1$-C$_4$alkoxycarbonylmethyl group or C$_1$-C$_4$alkylcarbonyl-methyl group, each unbranched or branched, unsubstituted or substituted, and optionally comprising hetero atoms (instead of C atoms; especially selected from O, N, such as NH or N-alkyl, and S),
R$^1$ and R$^2$ both denote hydrogen, and
Z$^1$ and Z$^2$ are as defined;
or X denotes a C$_1$-C$_4$alkyl group or C$_1$-C$_4$alkoxy group or C$_1$-C$_4$alkoxycarbonylmethyl group or C$_1$-C$_4$alkylcarbonylmethyl group, each unbranched or branched, unsubstituted or substituted, and optionally comprising hetero atoms (instead of C atoms; especially selected from O, N, such as NH or N-alkyl, and S),
Y and Z$^2$ together with the linking carbon atom denote —CN,
Z$^1$ is as defined above, and
R$^1$ and R$^2$ are each as defined above, with the proviso that at least one of the radicals denotes hydrogen;
and/or salts thereof. Preferred examples of such compounds are 2,4,6-pyrimidinetrione derivatives, barbituric acid (2,4,6-pyrimidinetrione) itself, 1-benzyl-5-phenylbarbituric acid (1-(phenylmethyl)-5-phenyl-2,4,6-pyrimidinetrione), 5-butylbarbituric acid (5-butyl-2,4,6-pyrimidinetrione), 1-cyclohexyl-5-ethylbarbituric acid (1-cyclohexyl-5-ethyl-2,4,6-pyrimidinetrione) or 2-thiobarbituric acid (4,6-dihydroxy-2-mercaptopyrimidine), 1,3-cyclohexanedione, 2-methyl-1,3-cyclohexanedione, 1,3-cyclopentanedione, 2-methyl-1,3-cyclopentanedione, 4,4-dimethyl-1,3-cyclohexanedione, 5,5-dimethyl-1,3-cyclohexanedione (dimedone), 2,2-dimethyl-1,3-dioxane-4,6-dione or 2,2,5-trimethyl-1,3-dioxane-4,6-dione, 3-oxoglutaric acid dimethyl ester, and/or diethyl-1,3-acetone dicarboxylate, ethyl cyanoacetate, methyl cyanoacetate or 2-ethylhexyl cyanoacetate, or 1,3-dioxo compounds mentioned in DE 10 2011 078 785. Reference is made here to German Patent Application DE 10 2014 105 202.1 of 11.04.2014, which is incorporated in this regard by reference.

The mentioned hardener system can be present as a finished hardener composition (for example with microencapsulated components a) and b) or, preferably, only be fully formed on mixing with further components of a synthetic resin composition (to a certain extent as a composition (mixture)), for example during use.

Relative to the hardener component, the proportion of initiator (actual hardener) here in a possible preferred embodiment of the invention is from 0.5 to 90% by weight, especially from 0.9 to 30% by weight.

The proportion of hardener in a synthetic resin fixing mortar according to the invention, relative to the mass (weight) of all reactants and additives without packaging, preferably lies in a range of from 1 to 60% by weight, for example from 2 to 50% by weight, it being possible for the proportion of peroxide, likewise relative to the mass of the total associated reactive resin formulation (100%), to be 0.1 or more % by weight, in an especially preferred embodiment from 0.1 to <1% by weight, furthermore also from 1 to 10% by weight.

The free-radical-hardenable unsaturated reactive resin (and/or the totality of its components) is provided, for example, in a proportion by weight of from 5 to 99.5%, such as for instance from 10 to 98.5%, for example from 10 to 89.5%.

Here too, "based on" means that the synthetic mortar fixing systems according to the invention can also include, in addition to the mentioned components, further customary ingredients (for example additives or other constituents as mentioned hereinabove or hereinbelow). Such further ingredients can be present together, for example in an amount of in total up to 80% by weight, preferably between 0.01 and 65% by weight. Even where "based on" is not expressly mentioned, such customary ingredients are included.

As non-reactive diluents in all reactive synthetic resins described hereinabove there can be added, for example, vegetable oils, such as castor oil, or furthermore bio-alcohols and fatty acids and esters thereof, or mixtures of two or more thereof, for example in a proportion of from 3 to 60% by weight, for example from 4 to 55% by weight.

Alkyl (also in alkylene or aralkyl or cycloalkylalkyl) within this disclosure denotes especially an unbranched or singly or multiply branched alkyl radical having, for example, from 1 to 20, preferably from 1 to 10 carbon atoms, for example having from 1 to 4 carbon atoms, such as, for example, methyl, ethyl, n-propyl, isopropyl, n-butyl, sec.-butyl, isobutyl or tert-butyl. "Lower alkyl" means alkyl having from 1 to 7, preferably from 1 to 4, carbon atoms.

Cycloalkyl (also in cycloalkylalkyl) denotes especially mono-, di- or tri-cyclic, preferably monocyclic, cycloalkyl having from 3 to 20 carbon atoms, preferably having from 3 to 10 carbon atoms, in the ring, especially cyclopentyl or cyclohexyl.

Aryl (also in arylalkyl, aralkyl) denotes a mono-, di- or tri-cyclic, preferably monocyclic, unsaturated cyclic hydrocarbon radical, such as especially phenyl or naphthyl, it being possible for aryl to be unsubstituted or substituted, for example by one or more, for example up to three, $C_1$-$C_7$alkyl radicals.

A hole or crevice is to be understood as being a hole or crevice that is present in a building substrate and is accessible from the outside, for example a drilled hole or a recessed region made during mortaring with cement or gypsum or the like.

In a special embodiment of the invention, the reactive synthetic resin(s) (for example as component A) and the hardener (for example as component B) are stored separately from one another in a two-component or multi-component system before they are mixed with one another at the desired site (for example close to or in a hole or crevice, such as a drilled hole).

The systems are especially two-component systems, in which the weight ratio of component A to component B is from 99:1 to 1:99, from 99:1 to 50:50, from 99:1 to 60:40 or from 99:1 to 70:30.

Components which would otherwise react with one another in undesirable manner, such as water and the hydrolysable groups of the silanes being used according to the invention or water and cement, are then preferably to be kept separate from one another before use in the hole or crevice.

For example, therefore, a component (A) of such a two-component or furthermore multi-component system includes the reactive synthetic resin(s), whereas component (B) includes the hardener. The silanes can be provided independently in the form of a third component, or they are a constituent of the reactive synthetic resin and/or hardener components. In all cases, the components in which silanes are present are to be kept susbstantially free of water (for example less than 0.1%, especially less than 0.05% by weight water relative to the total weight of the component in question), in order not to cause any undesirable hydrolysis and crosslinking by means of the Si-bonded hydrolysable groups, or the silanes and the water are to be kept separate from one another (for example by means of micro-encapsulation). Alternatively, the silanes can also be present in oligomerised form (for example formed during storage as a result of reaction with water that is present, or produced beforehand, for example using or in analgous manner to methods shown in DE 10 2011 086 862 A1, from the above-mentioned (at least substantially monomeric) silanes.

The injectable synthetic resin systems according to the invention can consequently be provided as single-component systems (if components, for example the hardener, which are otherwise reactive with further components present, are protected, for example encapsulated) or preferably multi-component systems (multi-component kit) and are also used as such.

A multi-component kit is understood to be especially a two-component or multi-component kit (preferably a two-component kit) having a component (A), which comprises one or more reactive synthetic resins, as described hereinabove and hereinbelow, and hardener (component (B)), it being possible for further additives to be provided in one or both of the components, preferably a two-chamber or furthermore multi-chamber apparatus, wherein the components (A) and (B) that are able to react with one another and optionally further separate components are present in such a way that they cannot react with one another during storage, preferably in such a way that they do not come into contact with one another prior to use, but that enables components (A) and (B) and optionally further components to be mixed together for fixing at the desired location, for example directly in front of or in a hole, and, if necessary, introduced in such a way that the hardening reaction can take place therein. Also suitable are capsules, for example made of plastics, ceramics or especially glass, in which the components are arranged separated from one another by means of rupturable boundary walls (which can be ruptured, for example, when an anchoring element is driven into a hole or crevice, such as a drilled hole) or integrated separate rupturable containers, for example in the form of capsules, such as ampoules, arranged one inside the other; and also especially multi-component or especially two-component cartridges (which are likewise especially preferred), the chambers of which contain the plurality of components or preferably the two components (especially (A) and (B)) of the fixing mortar according to the invention having the compositions mentioned hereinabove and hereinbelow for storage prior to use, the kit in question preferably also including a static mixer.

The use of a fixing mortar according to the invention at the desired site of use is effected by mixing the associated components, especially close to or directly in front of a hole or (for example especially when cartridges having static mixers are used or when suitable capsules are broken) inside a hole or crevice, for example a drilled hole.

"Embedding in mortar" is especially to be understood as meaning (material-bonded and/or interlocking) fixing of anchoring elements made of metal (for example undercut anchors, threaded rods, screws, drill anchors, bolts) or, furthermore, made of some other material, such as plastics or wood, in (solid) building substrates, which includes concrete or masonry, especially insofar as they are constituents of artificially erected structures, more especially masonry, ceilings, walls, floors, panels, pillars or the like (for example made of concrete, natural stone, masonry made of solid blocks or perforated blocks, furthermore plastics or wood), especially in holes, such as drilled holes.

Those anchoring elements can then be used to fix, for example, railings, covering elements, such as panels, facings or other structural elements.

The introduction of the anchoring element(s) is preferably effected only a short time, preferably 30 minutes or less, after the components of the synthetic mortar fixing system according to the invention have been mixed together. In explanation: the mixing/introduction of the components at/into the desired locations at which anchoring elements are to be fixed, especially holes, such as drilled holes, initiates a plurality of reactions which proceed substantially in parallel and/or with only a very small time interval between them, especially polymerisation. The final curing takes place in situ.

Preferred embodiments of the invention are also to be found in the claims (especially the subordinate claims), which are incorporated herein by reference, and also in the Examples.

FIG. 1 (FIG. 1) shows the dependence of the bonding strength on the average particle size of the particles used in Example 1.

The Examples that follow serve to illustrate the invention, without limiting its scope.

Example 1: 2-Component Synthetic Mortar Fixing Systems According to the Invention and for Comparison Using the urethane methacrylate resin produced according to Example 2, the following 2 components for 2-component synthetic mortar fixing systems according to the invention were each produced:

| Raw material | Proportion [%] |
|---|---|
| Synthetic resin component | |
| Urethane methacrylate resin | 35.5 |
| Methacryloxypropyltrimethoxysilane | 6 |
| Inhibitor mixture (selected from t-BBC, hydroquinone and/or Tempol) | 0.06 |
| Aminic accelerator | 0.5 |
| Filler | 56 |
| Pyrogenic silica | 1.94 |
| Total | 100 |
| Hardener | |
| Demineralised water | 30 |
| Stabilised dibenzoyl peroxide (33%) | 42 |
| Quartz sand | 26.5 |
| Additives and thickeners | 1.5 |
| Total | 100 |

As "filler" there are used quartzes, α-aluminium oxides, gypsums, chalks and and aluminium hydroxides in the stated fineness grades in the individual formulations.

The synthetic resin component and the hardener are filled into commercially available cartridges in a mixing ratio of 5:1.

The following measurement results were obtained:

| Filler | Average particle diameter d50 [μm] | Bonding strength [N/mm²] | Tensile strength σ B MPa | E GPa | ε B % | Compressive strength σ D MPa | E GPa | ε D % |
|---|---|---|---|---|---|---|---|---|
| Quartz | 400 | 27.3 | 7.9 | 3.1 | 0.3 | 38 | 1.1 | 4.5 |
| Quartz | 180 | 26.0 | 10.1 | 3.7 | 0.3 | 45.1 | 1.5 | 4.5 |
| Quartz | 100 | 27.0 | 12 | 3.5 | 0.4 | 37.8 | 1.1 | 4.8 |
| Quartz | 90 | 27.1 | 12.5 | 3.8 | 0.3 | 58.9 | 1.5 | 6.8 |
| Quartz | 40 | 28.7 | 13.4 | 4 | 0.4 | 63 | 1.1 | 7.4 |
| Quartz | 30 | 29.0 | 15.7 | 4 | 0.4 | 76.6 | 1.4 | 7.4 |
| Quartz | 20 | 28.3 | 17.5 | 4.3 | 0.5 | 86 | 1.8 | 7.5 |
| Quartz | 17 | 30.2 | 19.5 | 4 | 0.5 | 94.8 | 1.8 | 8.1 |
| Quartz | 5 | 29.3 | 20 | 4.1 | 0.5 | 90 | 1.7 | 7.7 |
| Quartz | 4 | 29.6 | 14.9 | 4.2 | 0.4 | 88.8 | 1.8 | 7.3 |
| Aluminium oxide | 75 | 25.4 | | | | | | |
| Aluminium oxide | 1.77 | 29.9 | | | | | | |
| Aluminium oxide | 1.69 | 32.4 | | | | | | |

-continued

| Filler | Average particle diameter d50 [μm] | Bonding strength [N/mm²] | Tensile strength σ B MPa | Tensile strength E GPa | Tensile strength ε B % | Compressive strength σ D MPa | Compressive strength E GPa | Compressive strength ε D % |
|---|---|---|---|---|---|---|---|---|
| Aluminium oxide | 0.8 | 29.2 | | | | | | |
| Aluminium hydroxide* | 22.4 | 24.6 | | | | | | |
| Calcium carbonate* | 6 | 26.2 | | | | | | |
| Gypsum* | 125 | 27.1 | | | | | | |
| Calcium carbonate* | 9 | 27.1 | | | | | | |
| Calcium carbonate* | 60 | 27 | | | | | | |

*) comparison tests without a size effect.
σ denotes tensile or compressive strength,
ε denotes extension or compression on breaking.
The values for bonding strength are also represented graphically in Fig. 1.
The circular symbols denote materials without a size effect.

Test Methods:

The components are and were in the present case subjected to an adhesion failure test using a commercially available 2-chamber cartridge with static mixture analogously to the Guidance Note of the "European Organisation for Technical Approvals" (EOTA) (2001): ETAG No. 001 Edition November 2006, Guidance Note for European Technical Approval for metal anchors for anchoring in concrete, Part 5: Bonded anchors, April 2013 and the mean value of the adhesion failure load from 5 tests for M12 bolts at an anchoring depth of 75 mm was determined (drilled hole cleaning 2× blowing out, 2× brushing, 2× blowing out, full curing time 24 hours at 23° C.).

The tensile strength is and was determined using shouldered rods of the 1 BA test specimen type according to DIN EN ISO 527 and the compressive strength is measured in accordance with DIN EN ISO 604, in each case after a curing time of 24 hours at 23° C.

Example 2: (A) Production of a Urethane Methacrylate Resin 191 g of HPMA, 174 g of BDDMA, 2.15 g of a mixture of stabilisers and catalysts dissolved in BDDMA were placed in a 1000-ml glass flask with a reflux condenser with drying tube, stirrer, dropping funnel and thermometer and heated to 60° C. in an oil bath. 132 g of PMDI (average functionality=about 2.9) were slowly added to the reaction dropwise so that the temperature did not rise above 90° C. After addition of the PMDI was complete, stirring was carried out for 30 minutes more at 80° C. in order to bring the reaction to completion. Complete reaction was monitored by means of FT-IR (freedom from isocyanate groups detectable by IR spectroscopy).

PMDI: Diphenyl methane diisocyanate with isomers and higher-functional homologues, molecular weight 430 g/mol, functionality 3.2 (manufacturer's data)

BDDMA: 1,4-Butanediol dimethacrylate (technical-grade product)

Example 3: Example for Epoxy Resin Composition

| Raw material | Proportion [%] |
|---|---|
| Synthetic resin component | |
| Bisphenol A/F resin | 45 |
| Trimethylolpropane triglycidyl ether | 15 |

-continued

| Raw material | Proportion [%] |
|---|---|
| Wetting and dispersing agent | 2 |
| Pigment | 0.5 |
| α-Aluminium oxide d50 = 1.69 μm | 35.5 |
| Pyrogenic surface-treated silica | 2 |
| Total | 100 |
| Hardener | |
| Mannich base formulation | 60 |
| α-Aluminium oxide d50 = 1.69 μm | 36.5 |
| Pyrogenic surface-treated silica | 2 |
| Additives and pigments | 1.5 |
| Total | 100 |

The components were filled into a 3:1 cartridge and tested against the product FIS EM 390 S from the company fischerwerke GmbH & Co. KG. It was possible for the bonding strength to be increased by more than 10%.

The invention claimed is:

1. A method of fixing an anchoring element in a hole or crevice in a building substrate, comprising introducing a multi-component synthetic mortar fixing system and an anchoring element into the hole or crevice, and allowing the multi-component synthetic mortar fixing system to cure, wherein the multi-component synthetic mortar fixing system comprises in one component reactive synthetic resins (i) based on urethane (meth)acrylate, (ii) based on epoxy resin or (iii) based on free-radical-hardenable unsaturated reactive resins, in a further component hardener; and at least one filler selected from oxides of silicon and aluminium, and from mixed oxides in the presence of further cations, wherein each filler comprises the d50 average particle size of which is 10 μm or less.

2. The method according to claim 1, wherein in the multi-component synthetic mortar system the fillers are selected from those mentioned except for the mixed oxides.

3. The method according to claim 1, wherein in the multi-component synthetic mortar system the at least one filler is quartz.

4. The method according to claim 1, wherein in the multi-component synthetic mortar system, as further additive, at least one silane including at least one Si-bonded hydrolysable group, or the filler is present in a form modified using such a silane.

5. The method according to claim 4, wherein in the multi-component synthetic mortar system, as silane, 3-(meth)acryloyl-oxypropyl-trimethoxysilane or -triethoxysilane, 3-(meth)acryloyl-oxymethyl-trimethoxysilane or -triethoxysilane, 3-(meth)acryloyl-oxypropylmethyldimethoxysilane, vinyltrimethoxysilane, vinyltriethoxysilane, or tetraalkoxysilane, or a mixture of two or more thereof, is present and/or the filler is surface-modified therewith.

6. The method according to claim 1, wherein in the multi-component synthetic mortar system, as reactive synthetic resin, there is used one (ii) based on epoxy or (iii) based on free-radical hardening unsaturated reactive resins.

7. The method according to claim 1, wherein in the multi-component synthetic mortar system, as reactive synthetic resin, there is present one based on urethane (meth) acrylate.

8. The method according to claim 7, wherein in the multi-component synthetic mortar system the reactive synthetic resin based on urethane (meth)acrylate results from the reaction of a prelengthened monomeric di- or poly-isocyanate and/or from the reaction of a polymeric di- or poly-isocyanate with hydroxyethyl or hydroxypropyl (meth) acrylate.

9. The synthetic mortar fixing system according to claim 1 in the form of a two-component system.

* * * * *